United States Patent [19]

Pominski et al.

[11] 4,025,658

[45] May 24, 1977

[54] MILK-LIKE PRODUCTS FROM PEANUTS

[75] Inventors: Joseph Pominski, Metairie; James J. Spadaro, New Orleans, both of La.

[73] Assignee: The United States of America as represented by the Secretary of Agriculture, Washington, D.C.

[22] Filed: Oct. 30, 1975

[21] Appl. No.: 627,325

[52] U.S. Cl. .................................. 426/598; 426/632
[51] Int. Cl.² ...................... A23L 1/36; A23C 11/00
[58] Field of Search ................... 426/632, 598, 457

[56] References Cited
UNITED STATES PATENTS

| | | | |
|---|---|---|---|
| 3,288,614 | 11/1966 | Miles | 426/598 |
| 3,639,129 | 2/1972 | Mustakes et al. | 426/598 |
| 3,689,287 | 9/1972 | Mitchell, Jr. | 426/457 |
| 3,800,056 | 3/1974 | Mitchell, Jr. | 426/632 |
| 3,947,599 | 3/1976 | Mitchell, Jr. | 426/457 |

*Primary Examiner*—Raymond N. Jones
*Assistant Examiner*—C. A. Fan
*Attorney, Agent, or Firm*—M. Howard Silverstein; David G. McConnell; Salvador J. Cangemi

[57] ABSTRACT

This invention relates to a process for preparing milk-like products from peanuts. More particularly, this invention relates to a process whereby peanuts are heated, blanched, ground into a peanut flour and then heated in an aqueous solution to give a stable milk-like suspension.

1 Claim, No Drawings

MILK-LIKE PRODUCTS FROM PEANUTS

Prior art methods of preparing peanut milks included (1) grinding roasted full fat peanuts into a liquid product composed of solid particles suspended in the nut oil, mixing the product with water and an emulsifying agent and heating (2) making a milk-like product fromm peanut protein isolates and (3) mixing peanut and soy flours with water and then heating and filtering. In none of these processes is a drink made in which a peanut product is completely suspended without use of a stabilizer or without prior removal of a fraction of the peanut solids material.

Peanut flour, prepared from peanuts which have been heated to a temperature not to exceed 250° F, blanched, and which may have had some or essentially all of the oil removed prior to grinding into a flour is mixed with water using a preferred ratio of about 1:9 by weight respectively. The mixture is then heated for about one minute at about 212° F and then for ten minutes at about 180° F and cooled. Under refrigeration the resulting milk-like products have suspension times of up to 194 hours, have no raw taste, are white in color, are capable of being pasteurized and requires no emulsifiers or stabilizers.

The peanut flour used in this invention can be prepared from full-fat peanuts, partially defatted peanuts, or peanuts which are essentially free of oil.

In the preferred embodiment of this invention, peanuts are heated to a temperature of about 250° F for a period of about 15 minutes. Care is taken to keep the moisture content at about 3–4%. This temperature and moisture range is sufficient to keep the peanuts in their raw state and is not high enough to brown the peanuts. The peanuts are then blanched by conventional means and then some or essentially all of the oil is removed by hexane extraction or by simply pressing out the oil in a conventional press. The defatted or partially defatted peanuts are then ground to a fine particle size and thoroughly mixed with water using a ratio of 1:9 by weight respectively. The mixture is then heated to 212° F for about one minute and then pasteurized for 10 minutes at 180° F. The milk-like suspension can then be cooled and refrigerated and kept for periods of up to 194 hours.

Homogenizing and emulsifying vegetable fats (such as cottonseed, peanut, and coconut) and peanut protein flours are done simultaneously in machines such as high pressure piston-type, gear type, impulse rotary or ultrasonic vibrators. A Gaulin two stage homogenizer was used and was operated at pressures ranging from 1500 to 5000 psi in the first stage and from 800 to 2500 psi in the second stage.

Particle sizes of products are reduced to an average of ½ to 2 microns. Reduction in particle size improves mouth feel and emulsifying properties.

In another embodiment of this invention, flour can be made from peanuts which have had no oil removed. In this process, raw peanuts are heated to a temperature not to exceed 250° F for about 15 minutes. The peanuts are then blanched and the moisture content adjusted to give a moisture of about 6–9%. The peanuts are then ground in a mill to give a peanut flour with no oil removed. The flour can then be mixed with water, heated for about 1 minute at 212° F, and then pasteurized for 10 minutes at 180° F. The resulting milk-like suspension can then be cooled and refrigerated and kept for periods of up to 48 hours.

The following examples illustrate but do not limit the scope of this invention.

EXAMPLE 1

Raw peanuts were heated to temperatures of 200° F for 40 minutes, blanched, i.e., the skins were removed, pressed in a press until 57% of the oil was removed and then ground through a pin mill to give a white partially defatted peanut flour.

EXAMPLE 2

The peanut flour prepared in Example 1 was mixed with water in solid concentrations of 2–18%, heated to 212° F and held at 212° for 1 minute. Suspension time is shown in Table I, Column A.

Table I

| EFFECT OF CONCENTRATION ON SUSPENSION OF PEANUT MILK[1] | | |
|---|---|---|
| | Preparation | |
| | A[2] | B[3] |
| Concentration % Solids | Suspension Time, | Hours |
| 2 | 1–2 | 1–2 |
| 6 | 5+ | 1–2 |
| 8 | 72+ | 2–3 |
| 10 | 96+ | 96+ |
| 14 | 46[4] | 46[4] |
| 18 | 46[4] | 46[4] |

A "+" indicates that the preparations remained suspended for times shown and that a reading 16 hours later showed that settling had started.
[1]Prepared from peanuts that were pressed and then ground through a pin mill.
[2]Heated to 212° F then 1 min. at 212° F, cooled and refrigerated.
[3]Heated to 212° F then 10 min. at 180° F, cooled and refrigerated.
[4]After about 46 hours, the preparation had become either viscous or gell-like therefore keeping solids in suspension until curdling occurs.

EXAMPLE 3

The peanut flour prepared in Example 1 was mixed with water in solid concentrations of 2–18% and heated to 212° F and then for 10 minutes at 180° F. Suspension time is shown in Table I, Column B.

EXAMPLE 4

Defatted peanut flour prepared as in Example 1 was mixed with water in a solid concentration of 10%. This mixture has a protein and fat content comparable to that of dairy milk. The mixture was then heated at temperatures ranging from 75° F to 212° F for 1–30 minutes. Results are shown in Table II.

Table II

| EFFECTS OF TEMPERATURE AND TIME ON SUSPENSIONS OF MILKS[1] | | | | |
|---|---|---|---|---|
| | Heating Time, Minutes[2] | | | |
| Temp. °F | 1 | 5 | 10 | 30 |
| | Suspension Time, | | | Hours |
| 75 | | | | .2 |
| 140 | | | | 11+ |
| 160 | | | .3 | 11+ |
| 180 | .5 | .5 | 7+ | 7.5+ |
| 200 | 51+ | 50+ | 49+ | |
| 212 | 194+ | 193+ | 122+ | |

[1]Prepared from peanuts that were pressed and then ground through a pin mill.
[2]After heating all mixtures were cooled and refrigerated.
NOTE: A "+" indicates that the preparations remained suspended for times shown, and that a reading 16 hours later showed that settling had started.

EXAMPLE 5

Raw peanuts were heated to temperatures of 140° F for 40 minutes, blanched, and then pressed to remove 22–71.8% oil. The partially defatted peanuts (samples with various amounts of oil removed) were ground through a pin mill and then mixed with water in a solid concentration of 10%. The suspensions were then heated to 212° F and then for 10 minutes at 180° F. Results are shown in Table III.

EXAMPLE 6

The peanut flours prepared in Example 5 were mixed with water in a solid concentration of 10% and heated to 212° F and held at 212° F for 1 minute. Suspension time is shown in Table III.

Table III

EFFECTS OF FLOUR WITH VARIOUS FAT CONTENTS ON SUSPENSIONS OF MILKS[1]

| Tests[2] | % Fat Removed | | | |
|---|---|---|---|---|
| | 22 | 38.5 | 59.1 | 71.8 |
| | Suspension Time | | Hours | |
| To 212° F and 10 min at 180° F | 3 | 23 | 18 | 25+ |
| 1 min at 212° F | 10.5+ | 66+ | 42+ | 42+ |

[1]Prepared from peanuts (46% Fat) that were pressed and then ground through a pin mill.
All mixtures were cooled and refrigerated.
NOTE: A "+" indicates that the preparation remained suspended for times shown and that a reading 16 hours later showed that settling had started.

EXAMPLE 7

Raw peanuts heated to temperatures of 185° F for 80 minutes prior to blanching were extracted with hexane to remove 99% (approximately 1% oil in the extracted meal) of the oil. The defatted peanut was then ground in a pin mill, mixed with water in a solid concentration of 10% and heated to 212° F and then for 10 minutes at 180° F. The aqueous mixture remained suspended for 54+ hours under refrigeration.

EXAMPLE 8

Raw peanut flour prepared as in Example 1 was mixed with water in a solid concentration at 10%. The mixture (2 liters) was then heated at a temperature of 250° F (15 lbs. gage pressure) in a pressure cooker for 3 minutes. The mixture was then homogenized, freeze-dried and ground in a mortar and pestle. The freeze-dried instant milk-like powder mixed readily with water to yield a white milk-like suspension with no raw taste.

EXAMPLE 9

Raw peanut flour prepared as in Example 1 was mixed with water in a solids concentration of 10%. The mixture was treated as in Example 8 with addition of 100 grams of sugar and 33 ml of vanilla prior to homogenizing and freeze drying. The dried instant milk-like powder that was obtained was mixed with water to give a pleasant vanilla milkshake type drink.

EXAMPLE 10

Raw peanuts heated to a temperature of 230° F for 16 minutes and blanched were extracted with hexane to remove 99% (approximately 1% oil in the extracted meal) of the oil. The defatted peanut was then ground into a flour in a pin mill. This raw peanut flour was mixed with water in a solids concentration of 7.0% with 3.5% saturated coconut fat, 0.3% monoglyceride emulsifier, and 0.05% of a carrageenan stabilizer. The mixture was heated at 212° F for 1 minute, cooled and held at 180° F for 30 minutes, homogenized, and spray dried. During spray drying, inlet air temperature was 428° F (220° C) and outlet temperature was 183° F (84° C). A convenient white powder was obtained that mixed with water to give a milk-like drink which had no raw taste. A mixture of these solids and water in a solids concentration of 10% has a protein and fat content comparable to that of dairy milk.

EXAMPLE 11

Raw peanut flour prepared as in Example 10 was mixed with water and a saturated coconut fat and processed in the same manner as in Example 10 with no emulsifier and no stabilizer. The spray dryed milk-like powder mixed with water to give a milk-like drink which had no raw taste.

EXAMPLE 12

Raw peanut flour prepared as in Example 10 was mixed with water in a solids concentration of 7.0% with 3.5% cottonseed oil, 0.03% monoglyceride emulsifier and .05% of a carrageenan stabilizer. The mixture was heated at 212° F for 1 minute, cooled and held at 180° F for 5 minutes, homogenized and cooled to give a pleasant milk-like tasting drink that remained suspended for over 7 days under refrigeration.

EXAMPLE 13

Raw peanut flour prepared as in Example 10 was processed as described in Example 12 except that peanut oil was used instead of cottonseed oil. A milk-like drink with a pleasant taste was obtained that remained suspended for over 7 days under refrigeration.

EXAMPLE 14

Raw peanuts were heated to a temperature of 140° F for about 40 minutes to a moisture content of 5.5% and blanched; and then ground through a pin mill to give a white full-fat flour which was then mixed with water in a solid concentration of 10%. The mixture was heated for 1 minute at 212° and for 10 minutes at 180° F. After cooling the aqueous mixture remained suspended for 48 hours under refrigeration.

EXAMPLE 15

Raw peanuts were heated to a temperature of 230° for 16 minutes and blanched. The moisture was adjusted from about 4% to 6 and 9% and both materials were then ground through a pin mill to give white full-fat flours. Peanuts at 4 to 4.5% moisture would not grind into a flour.

We claim:
1. A process for preparing milk-like products from raw peanuts comprising:
   a. heating raw shelled peanuts to a temperature from about 140° to about 250° F for about 15 to 80 minutes, to a moisture content of about 3–4%;
   b. blanching the heated peanuts from (a) to remove the skins;
   c. adjusting the moisture content to a range of about 6–9%;
   d. grinding the peanuts from (c);
   e. mixing the ground peanuts from (d) with water in a ratio of 1:9 by weight respectively;
   f. heating the mixture from (e) to a temperature of 212° F for about one minute and then for about 10 minutes at a temperature of about 180° F.

* * * * *